C. W. GREENE.
STAND OR SUPPORT.
APPLICATION FILED MAR. 22, 1917. RENEWED SEPT. 19, 1919.
1,338,437.
Patented Apr. 27, 1920.
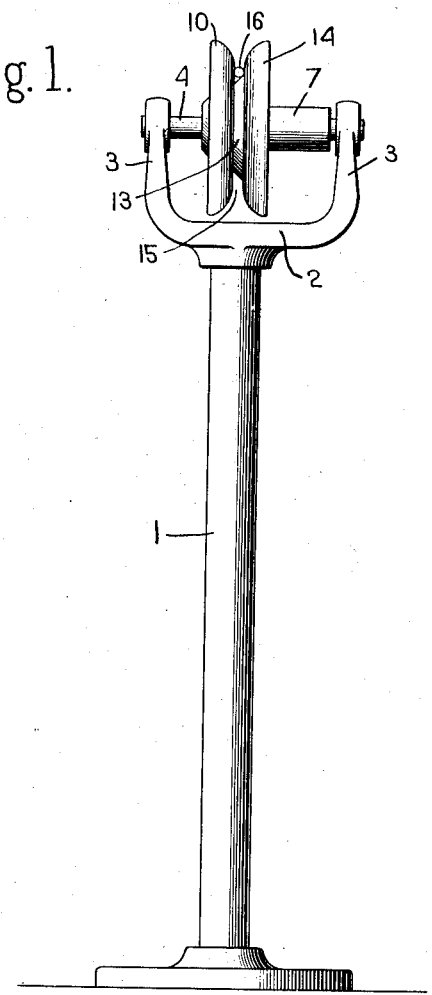
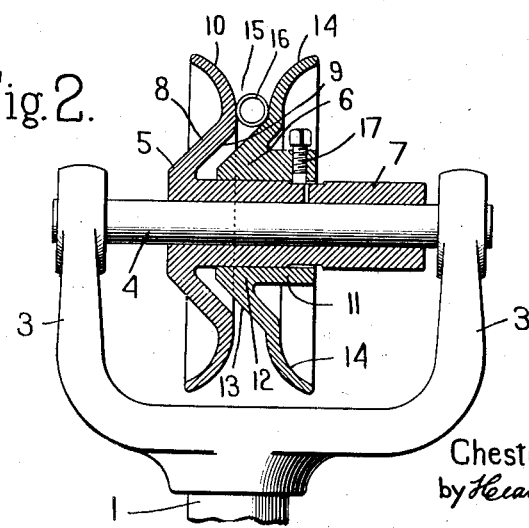
Inventor.
Chester W. Greene
by Heard Smith & Tennant.
Attys.

UNITED STATES PATENT OFFICE.

CHESTER W. GREENE, OF LYNN, MASSACHUSETTS, ASSIGNOR TO FRANCIS G. GALE, OF WATERVILLE, CANADA.

STAND OR SUPPORT.

1,338,437.  Specification of Letters Patent.  Patented Apr. 27, 1920.

Application filed March 22, 1917, Serial No. 156,554. Renewed September 19, 1919. Serial No. 325,033.

*To all whom it may concern:*

Be it known that I, CHESTER W. GREENE, a citizen of the United States, residing at Lynn, county of Essex, State of Massachusetts, have invented an Improvement in Stands or Supports, of which the following description, in connection with the accompanying drawing, is a specification, like characters on the drawing representing like parts.

This invention relates to a standard or support adapted for supporting a rod or tube which is being fed to or from a machine that is performing some operation on the rod or tube, and the object of the invention is to provide a novel stand or support provided with a novel adjustable bearing roll for the rod or tube, which roll can be readily adjusted to accommodate rods or tubes of different sizes with the axis of each tube or rod always at the same distance from the floor, regardless of the size of the tube or rod.

In order to give an understanding of my invention, I have illustrated in the drawings, a selected embodiment thereof which will now be described, after which the novel features will be pointed out in the appended claims.

Figure 1 is a side view of a device embodying my invention;

Fig. 2 is an enlarged sectional view through the supporting roll.

1 indicates a stand or support adapted to be secured to the floor and having at its upper end a head 2 in the shape of a yoke presenting two arms 3. These arms sustain a shaft 4 on which the supporting roll is loosely mounted. This supporting roll is in the nature of a grooved roll having two guiding flanges between which the rod or tube to be supported is received. The roll is made in two sections, each section carrying one of the flanges. The two sections of the roll are indicated generally by 5 and 6. The section 5 is provided with an elongated hub 7 which is loosely mounted on the shaft 4 to rotate freely thereabout. This section 5 is formed at one end with the cone-shaped portion 8 having the undercut wall 9 and with the curved flange 10, said flange extending from the periphery of the cone-shaped portion 8. The other section 6 is provided with a hub or sleeve 11 which is mounted on the hub 7 and is capable of being adjusted longitudinally thereof. This section 6 is provided with the cone-shaped portion 12 having the same shape as the cone-shaped portion 8 of the section 5. The cone-shaped portion 10 is formed with an exterior conical surface 13 which is parallel to the cone-shaped surface 9. The periphery of the cone-shaped portion 12 of the section 6 is formed into the outwardly-curved flange 14. The flanges 10 and 14 form between them a groove 15 in which is received the rod, bar or tube 16 to be supported.

One of the features of the present invention is to provide a support which will not only accommodate tubes or rods of different sizes, but will also support each size of tube with the center or axis thereof at the same height or elevation. This is accomplished by the cone-shaped portion 12 of the member 6. Fig. 2 shows the manner in which a tube 16 is supported, and it will be seen that to properly support the tube, the two sections 5 and 6 of the roll are adjusted so that the tube will just rest against the conical surface 13 and be confined in the smaller or inner portion of the groove 15. If a tube of larger size is to be supported, then the section 6 will be adjusted toward the left, Fig. 2, so as to provide at the inner end of the groove 15 a space wide enough to receive the larger tube, and when said larger tube is resting in the groove, it will contact with the conical surface 13 which will determine the vertical position of the tube. A larger tube, however, will have contact with the surface 13 at a point nearer the smaller end of the cone, and thus the underside of the larger tube will be at a lower level than that of the tube 16. The axial position of the larger tube, however, will be the same as that of the tube 16. To support a smaller tube, the section 6 is adjusted to the left, Fig. 2. Said smaller tube will, however, be supported with its axis at the same elevation as the larger tube. The section 6 is held in its adjusted position by means of a set-screw 17. The hub 7 is capable of slight longitudinal movement on the supporting shaft 4, and the roll will thus automatically center itself in a position with the groove thereof in the line of the tube or rod to be supported.

The device is capable of use for supporting any rod or tube which is being fed to or delivered from any machine constructed to perform some operation on the rod or tube.

I claim:

1. In a support for rods or tubes, the combination with a stand, of a supporting roll journaled thereon and presenting two sections forming between them a tube-receiving groove, said sections being adjustable relative to each other thereby to vary the size of the groove and being constructed to support different sizes of tubes or rods with their axes at the same elevation.

2. In a support for a tube or rod, the combination with a stand, of a supporting roll journaled therein and provided with two flanges forming between them a tube-receiving groove, said roll comprising a hub carrying one of the flanges and a sleeve adjustably mounted on the hub and carrying the other flange, said sleeve having a conical tube-positioning surface at the base of the flange carried thereby.

In testimony whereof, I have signed my name to this specification.

CHESTER W. GREENE.